United States Patent
Humphreys et al.

[11] 3,765,785
[45] Oct. 16, 1973

[54] METHOD AND APPARATUS FOR TRIMMING AND FINISHING PLASTIC JARS

[75] Inventors: Robert Lee Humphreys, Saint Charles; James Edward Spitzer, North Aurora, both of Ill.

[73] Assignee: American Can Company, Greenwich, Conn.

[22] Filed: Aug. 30, 1971

[21] Appl. No.: 176,151

[52] U.S. Cl............ 408/1, 408/36, 408/87, 29/33 S, 83/914, 425/292, 425/307
[51] Int. Cl............................................. B23b 35/00
[58] Field of Search ............ 408/1, 22, 28, 36, 408/44, 52, 117, 118, 224, 241 R, 87; 83/914; 425/292, 307, 304; 264/161

[56] References Cited
UNITED STATES PATENTS

| | | | |
|---|---|---|---|
| 3,391,588 | 7/1968 | Brown | 83/914 X |
| 3,417,428 | 12/1968 | Rupert | 83/914 |
| 3,564,655 | 2/1971 | Smith | 425/307 X |
| 3,610,768 | 10/1971 | Cochran | 408/204 |
| 3,540,324 | 11/1970 | Johansson | 408/227 |

*Primary Examiner*—Gil Weidenfeld
*Attorney*—Robert P. Auber et al.

[57] ABSTRACT

Method and apparatus for trimming and finishing in one operation plastic jars produced with a flange extending from the mouth thereof. A revolving cutter blade engages the edge of the mouth of the jar, and as the blade advances it cuts the flange from the jar. When the blade has cut the jar to the desired length, a gauge stops the blade's advance allowing it to finish the sealing surface of the jar. The stringy scrap is guided into stationary chip breakers which reduce the scrap into smaller pieces.

3 Claims, 11 Drawing Figures

INVENTORS
JAMES EDWARD SPITZER
ROBERT LEE HUMPHREYS
BY Lawrence E. Sklar
ATTORNEY

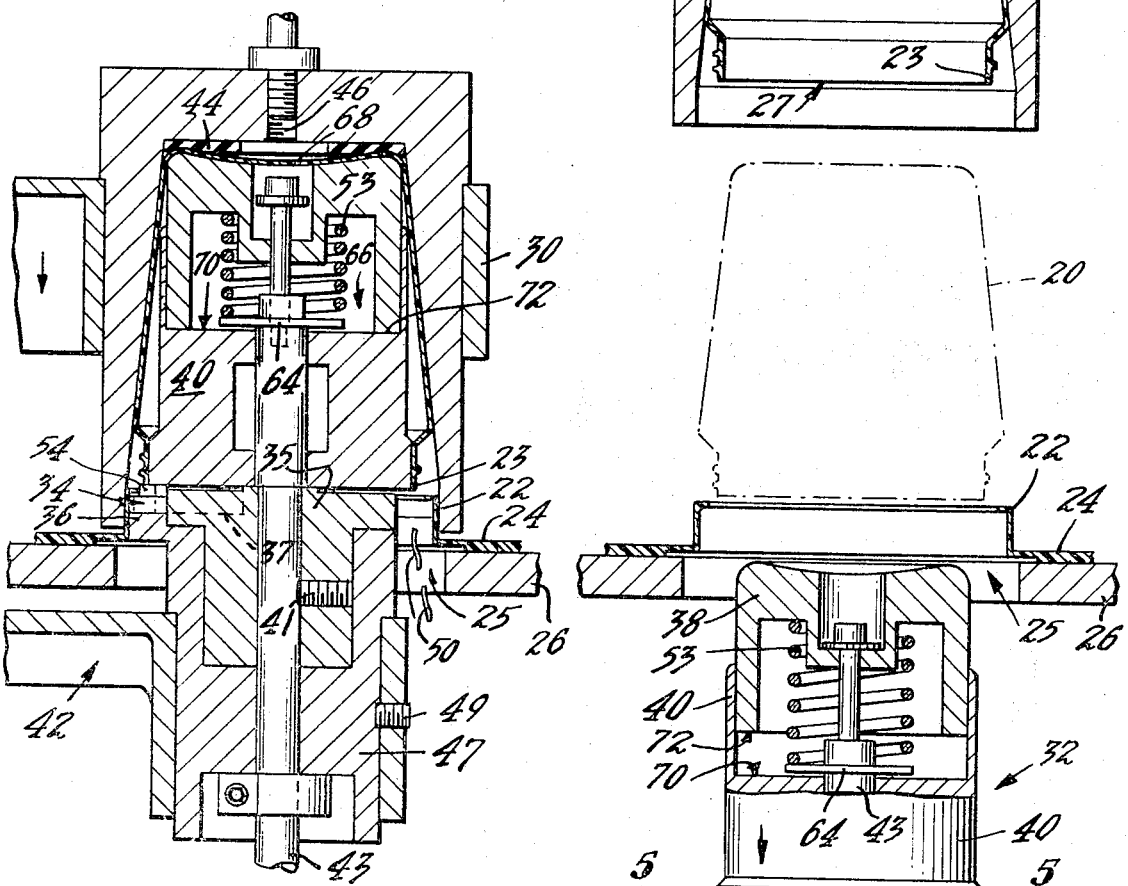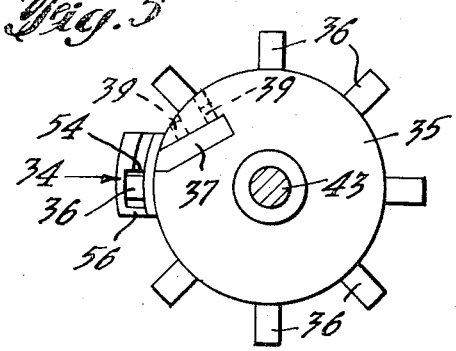

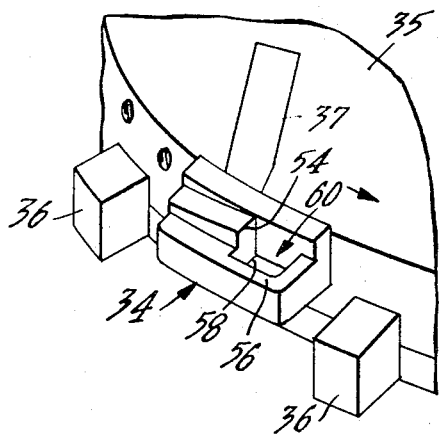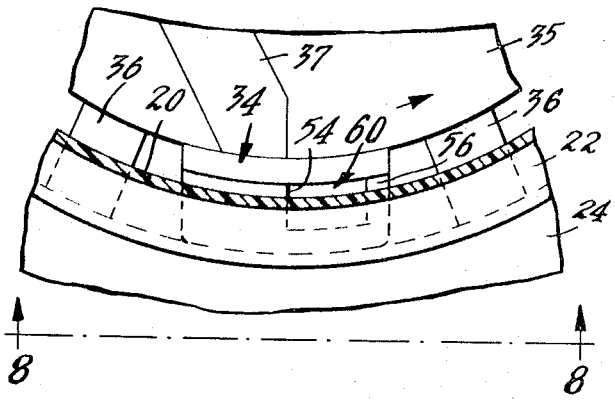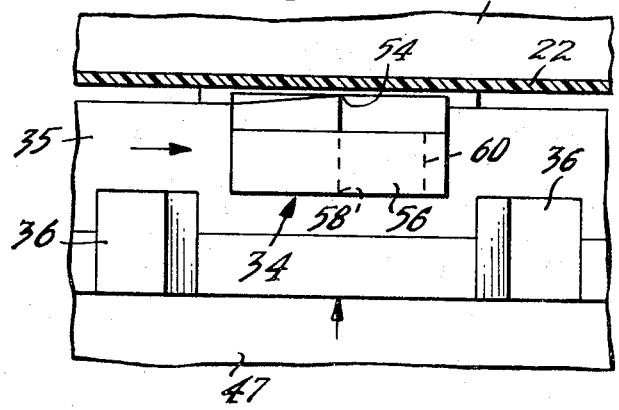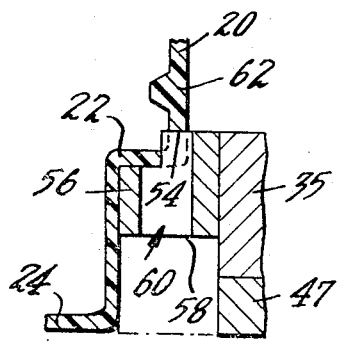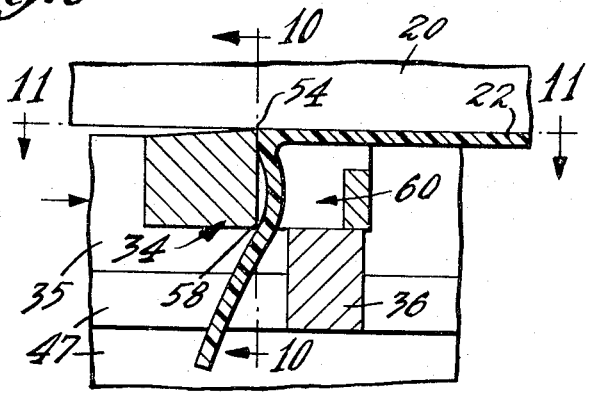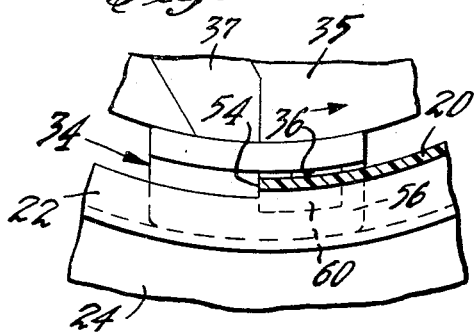

METHOD AND APPARATUS FOR TRIMMING AND FINISHING PLASTIC JARS

BACKGROUND OF THE INVENTION

The present invention relates to trimming and finishing in one operation plastic jars produced with a flange extending from the mouth of the jar, and more particularly to thermoplastic jars formed on a web.

In the production of jars having a flange extending from the mouth thereof, such as jars which are thermoformed on a web, there is no known method or apparatus for trimming away the flange from the jar and finishing the sealing surface of the jar in one operation. The present invention provides such a one-step trimming and finishing method, as well as apparatus to execute the method, and is particularly unique in that the sealing surface, also being the finished surface, lacks any die parting lines.

SUMMARY OF THE INVENTION

The instant invention comprises a method for trimming and finishing an annular, plastic jar produced with a flange extending from the mouth of the jar. The method includes axially advancing a revolving cutter blade to engage the edge of the mouth of the unfinished jar, trimming the flange from the jar with the revolving cutter blade, and stopping the cutter blade's axial advance, thereby finishing the jar's sealing surface.

BRIEF DESCRIPTION OF THE DRAWINGS

FIG. 3 is a central vertical sectional view of the apparatus of FIG. 2.

FIG. 4 is central vertical section of the apparatus and jar after the trimming and finishing operation, the lower portion in elevation, showing the finished sealing surface of the jar.

FIG. 5 is a horizontal sectional view taken on the plane indicated by the line 5—5 of FIG. 4.

FIG. 6 is an enlarged, fragmentary perspective view of the cutter blade assembly used in the trimming apparatus.

FIG. 7 is an enlarged, fragmentary plan view of the revolving cutter blade and an enlarged, fragmentary sectional view of the jar sidewall prior to the trimming and finishing operation.

FIG. 8 is an enlarged, fragmentary elevational view taken on the plane indicated by the line 8—8 of FIG. 7.

FIG. 9 is an enlarged, fragmentary, vertical sectional view of the cutter blade assembly and jar in the trimming and finishing position.

FIG. 10 is a vertical sectional view taken on the plane indicated by the line 10—10 of FIG. 9.

FIG. 11 is a horizontal sectional view taken on the plane indicated by the line 11—11 of FIG. 9.

DESCRIPTION OF THE PREFERRED EMBODIMENT

Figure 1:
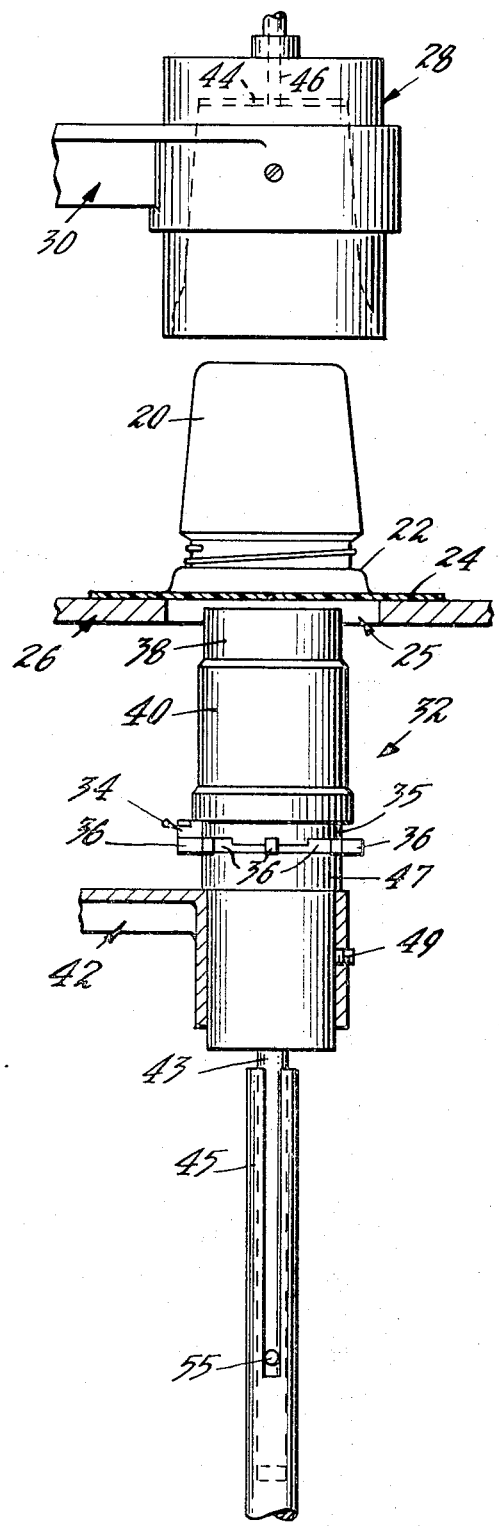
FIG. 1 is an elevational view of the trimming apparatus of the present invention and the plastic jar prior to the trimming and finishing operation.
Figure 2:
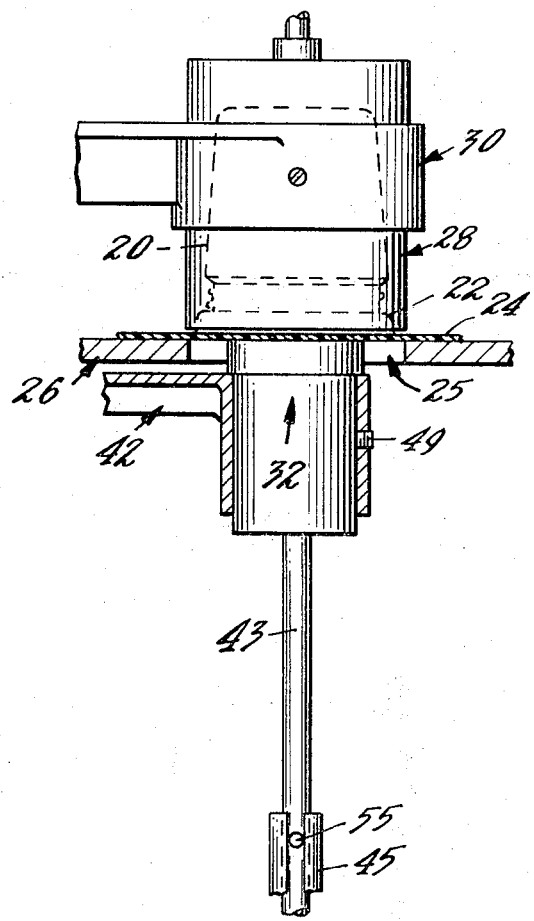
FIG. 2 is an elevational view of the apparatus of FIG. 1 in the trimming and finishing position.

We refer now to the drawings to describe the preferred embodiment of the instant invention. The method of the instant invention is best represented by FIGS. 1 and 2, wherein a plastic jar 20 having a flange 22 extending from the mouth 23 thereof is to be severed from a plastic web 24 and finished on its sealing surface 27. The jar 20 is generally formed by thermoforming techniques, but the invention is not limited to the manner of forming the jar 20.

The web 24 is advanced intermittently upon a feeding table 26 having an aperture 25 by conventional means not shown until the jar 20 is properly aligned with a holding pocket 28 and a trimmer assembly 32 for the trimming and finishing operation. The holding pocket 28 is then lowered by conventional drive means 30 from the open position indicated in FIG. 1 to the closed position indicated in FIG. 2. Finally, the trimmer assembly 32, which includes a revolving cutter blade 34 having a shank 37 (as shown in FIG. 5), a series of chip breakers 36, a spring loaded pilot 38 and a trimming pilot 40, is raised by conventional drive means 42 from the open position indicated in FIG. 1 to the closed position indicated in FIG. 2.

The chip breakers 36 are fixed to a stationary cylinder 47, which cylinder 47 is fixed to the drive means 42 by a set screw 49. The cutter blade 34 is fixed to a cylinder 35 by means of two set screws 39 which secure the cutter blade shank 37 to the cylinder 35, which in turn is rotated by a first shaft 43 which in turn is rotated by a second shaft 45 through a pin 55 and conventional drive means not shown. A set screw 41 fixes the cylinder 35 to the rotating shaft 43.

For a detailed discussion of the apparatus and its manner of functioning, reference is now made to FIGS. 3-11. As best seen in FIGS. 3 and 4, the holding pocket 28 is provided with a rubber gasket 44 and an opening 46 for maintaining a vacuum while transporting the trimmed and finished jar 20 to a packing table not shown. The rubber gasket 44 also provides friction with the jar 20 to prevent rotation during trimming and finishing, and accommodates irregularities of height when multiple position trimming machines are used.

FIG. 3 also illustrates the spring loaded pilot 38 engaging the trimming pilot 40, thereby guaging the trimming and finishing depth. The spring loaded pilot 38 includes a coil spring 53 held in place by a washer 64 and a recess 66 in the spring loaded pilot 38. As the trimmer assembly 32 is advanced axially upwardly, to engage the inside surface of the concave bottom wall 68 of the jar 20, the holding pocket 28 is lowered approximately simultaneously (for high speed manufacture) to engage the outside surface of the concave bottom wall 68. Once the spring loaded pilot 38 engages the concave wall 68, the trimmer pilot 40 continues to advance and remove plastic on the mouth 23 of the jar 20 until the recessed wall 70 of the trimming pilot 40 engages the annular surface 72 of the spring loaded pilot 38, thereby determining the amount of plastic to be trimmed and the height of the jar 20.

FIG. 4 illustrates the jar 20 held within the holding pocket 28 by means of a vacuum applied through opening 46. The jar 20 may now be transferred for subsequent discharge from the pocket 28. The spring loaded pilot 38 is now in its extended position, preparatory for the next trimming cycle. Also seen in FIG. 4 is the portion of the web 24 remaining after the trimming operation.

As the revolving cutter blade 34 is axially advanced to the closed position, it trims the jar 20 from the flange 22 by removing the plastic on the mouth 23 of the jar 20 adjacent the flange 22, indicated in FIG. 10 by the area 48 within the dotted lines. The design of the cutter blade 34, to be discussed hereinafter, is responsible for guiding the stringy scrap 40 (FIGS. 3 and 9) into the stationary chip breakers 36. Once the trimming depth is reached, further rotation of the cutter blade 34 results in finishing the sealing surface 27 of the jar 20 (FIG. 4). Because the sealing surface 27 is the surface that is trimmed and finished, it lacks any die parting lines or other defects arising from the method of forming the jar 20.

The chip breakers 36 and the unique design of the cutter blade 34 are the main elements which permit the method and apparatus presented herewith to function on a continuous basis, or even at all. For without means to guide the stringy scrap 50 away from the jar 20 and the cutter blade 34, the apparatus would soon become entangled with the stringy scrap 50 produced thereby.

Reference is now made to FIGS. 6–11 in describing the cutter blade 34 and chip breakers 36. FIG. 6 illustrates the design of the cutter blade 34 which not only trims and finishes the jar 20, but also guides the scrap 50 into the chip breakers 36. The cutter blade 34 includes a cutting edge 54 which trims and finishes the jar 20 by removing plastic on the jar 20 adjacent the flange 22, and a scrap guide 56 spaced from and situated forward of the cutting edge 54 which guides the stringy scrap 50 into the chip breakers 36. The edge 58 of the base of the cutter blade 34 shears the scrap 50 as it approaches the chip breaker 36, thereby breaking the scrap 50 into several smaller pieces which can then be conveyed away from the trimming apparatus by air or other means not shown (FIG. 9). The scrap 50 is forced into the chip breakers 36 owing to the scrap guide 56, which is shown to provide an enclosed passageway 60 forward of the cutter blade 54. The guide 56 need not provide such an enclosed passageway, but need only be of such design as to insure the scrap 50 being guided into the chip breakers 36.

It is thought that the invention and many of its attendant advantages will be understood from the foregoing description and it will be apparent that various changes may be made in the form, construction and arrangement of the parts of the article and that changes may be made in the steps of the method described and their order of accomplishment without departing from the spirit and scope of the invention or sacrificing all of its material advantages, the form hereinbefore described being merely a preferred embodiment thereof.

What is claimed is:

1. A method for trimming and finishing the sealing surface of an annular, plastic jar produced with a flange extending from the mouth thereof, comprising the steps of:

axially advancing a revolving cutter blade to engage the edge of the mouth of said jar;

trimming the flange from the jar with the revolving cutter blade;

guiding the stringy scrap produced by the cutter blade into stationary chip breakers, thereby reducing said scrap into smaller pieces; and stopping the cutter blade's axial advance, thereby finishing the jar's sealing surface.

2. The method of claim 1 comprising the additional step of surroundingly supporting the jar during the trimming and finishing steps.

3. The method of claim 2 wherein the plastic is thermoplastic and the jar is produced on a web by thermoforming.

* * * * *